Figure 1:
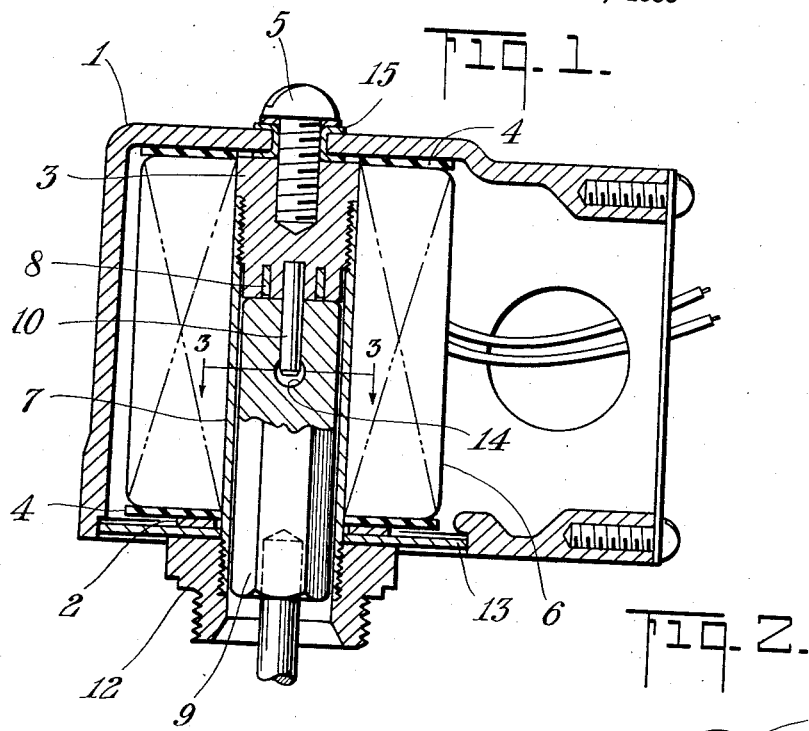

Oct. 17, 1939.   G. STUMPF   2,176,564
GUIDED SOLENOID CORE
Filed March 10, 1938

INVENTOR.
GEORGE STUMPF
BY
ATTORNEY.

Patented Oct. 17, 1939

2,176,564

UNITED STATES PATENT OFFICE 2,176,564

GUIDED SOLENOID CORE

George Stumpf, Bronx, N. Y., assignor to Automatic Switch Company, New York, N. Y.

Application March 10, 1938, Serial No. 195,057

1 Claim. (Cl. 175—341)

This invention relates to improvements in solenoids of the helix form particularly adapted for use with alternating current. It is a main object of the present invention to overcome the objectionable hum in the use of the solenoids with alternating current and to simplify the constructions by reducing the machining necessary therefor. Many unsuccessful efforts have been made to construct a simple, inexpensive solenoid that could be operated by alternating current without objectionable hum, inherent with all alternating currents, and in which the plunger would not stock when the current was cut off and in addition have the advantage of operating with a minimum of friction thereby conserving power.

A large number of attempts to solve the foregoing problems have been made centering the plunger both at its upper and lower ends in order to eliminate all vibrations or oscillations of the plunger while under the influence of the solenoid, it being well established that the hum is due to oscillations of the plunger. One accepted way of centering the lower end of the solenoid, is by the employment of non-magnetic rings or collars fitting the periphery of the plunger near its lower end. This, however, reduces the flow area around the core thus slowing up the action of the solenoid and introduces additional friction due to the engagement of the outer periphery of the plunger with the inner periphery of the body of the solenoid thereby reducing its efficiency.

My invention has accomplished these and other desirable objects in a simple way, one of the essential features being that the plunger or movable core makes a loose fit with the stationary non-magnetic tube composed of material such as monel or non-magnetic stainless steel whereby friction between movable core and tube is eliminated, while all other prior devices have frictional contact of a serious character between the core and tube.

The novelty of this device, in part, is in dispensing with any centering device near the lower end of the plunger while retaining its function thereby eliminating troublesome super-accurate machining and, on the other hand, devising a combined centering and guiding member so positioned as to provide flat contacting surfaces for the fixed and movable cores capable of being accurately ground in actual working position.

By dispensing with any centering device, except the combined centering and guiding device at the top of the movable core, the plunger has its outer periphery entirely free from contact with any and all parts thereby improving the efficiency of the device and simplifying its assembly. When the plunger is pulled upwardly by the energized solenoid the accurately ground flat surface of the plunger makes a desirable contact with a corresponding flat surface of the fixed core having a shading coil, positioned in the axial center of said core, and the combined centering and guiding member keeps constant the ratio of shaded and unshaded areas.

While overcoming the objectionable hum in the manner just mentioned I have provided means for overcoming the danger of the plunger sticking and to attain that end I have insulated the magnetic circuit of the core members from the main magnetic circuit as more fully described hereafter.

Other objects and advantages will be in part indicated in the following description and in part rendered apparent therefrom in connection with the annexed drawing.

Figure 2:
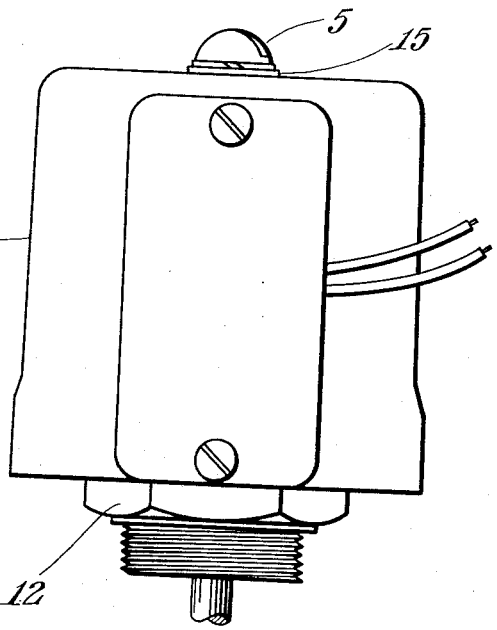
Figure 3:
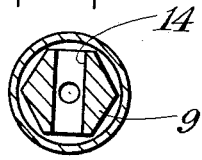

To enable others skilled in the art so fully to apprehend the underlying features hereof that they may embody the same in the various ways contemplated by this invention, drawings depicting a preferred embodiment of the invention have been annexed as a part of this disclosure and, in such drawings, like characters of reference denote corresponding parts throughout all the views of which:

Figure 1 is a vertical sectional view; Fig. 2 is a side view of the complete device and Fig. 3 is a transverse sectional view on the line 3—3 of Fig. 1.

The casing or cup member for the solenoid coil is marked 1, while 2 indicates the coil locking washer of a spring pressure type to prevent excessive vibration of the coil. The fixed core member is marked 3. Bakelite collars 4 at the top and bottom of the coil 6 are for insulating the coil from the metallic parts of the solenoid. The fixed core 3 and cup are secured together by the screw 5. The core tube 7 is secured to a bonnet 12 as shown in Fig. 1 the top end of said core tube containing the fixed core member 3. There is formed within this fixed core member a recess within which is positioned the shading coil 8. The coil 6 is a separate unit and fits over the core tube as shown.

The guide pin 10 is preferably made of 1/8 inch diameter round bronze 5/8 inch in length for centering and guiding a plunger approximately 1¾ inches in length, the hole or aperture in the core having 3 to 5 thousandths clearance, thereby permitting the pin to reciprocate freely within the aperture. As clearly indicated in Figure 1, the plunger or movable core 9 is mounted within the tube 7 so as to make a loose fit therewith, thus providing for a maximum flow area between the plunger 9 and tube 7, it being apparent that the clearance or open space between tube and core furnishes a passage for any extraneous liquid. When the coil 6 is de-energized the plunger may be retracted by gravity but same is preferably retracted by a spring (not shown) arranged near the lower end of the plunger in any usual and ordinary way. It is to be understood that the plunger may be connected with any ordinary sliding stem valve in the usual and ordinary way for controlling the opening and closing of a valve. Said spring washer 2 is shown intermediate the Bakelite washer 4 and the magnetic washer 13. A recess 14 transversely arranged is for clearance for the lower end of pin 10 and it is capable of providing an escape passage for dirt and foreign substances entering the recess within the plunger. An important feature as shown in Figure 1 is that the proportions of the pin and hole or pocket are such as to make a close fit and the pin is formed to guide the plunger during its entire movement, thereby dispensing with any other bearing for said plunger. For this reason the escape passage 14 is especially valuable because it permits air or any other fluid to escape.

It thus appears that the plunger has a combined centering and guiding member which enables me to dispense with any centering device for the lower end of the plunger, the top surface of the plunger making close contact with the lower surface of the fixed core 3. In practice, these contacting surfaces can be readily ground in actual working position, which is highly desirable, and enables me to make a close fit between those surfaces, as indicated in Figure 1. The grinding in actual working position is accomplished after the fixed core and tube are assembled in position, the movable core being inserted temporarily to detect any imperfect contact of core surfaces and in order to remedy same and to insure against the existence of same, the plunger is withdrawn to permit the proper grinding material to be applied to the core surface and thereafter by inserting the plunger and turning same the desirable grinding is accomplished. However, the more accurate grinding of the seating surfaces, while insuring the elimination of the objectionable hum, increases the danger of the residual magnetism causing the contacting surfaces of the fixed and movable cores to stick, thereby holding up the movable core after the coil is de-energized. In order to overcome such an objectionable sticking of parts, I employ a non-magnetic bushing 15 which is positioned between the fixed core member 3 and the cup 1 and is clamped in position by the non-magnetic set screw 5 thereby insulating and isolating the magnetic circuit of the fixed and movable members of the solenoid from the main magnetic circuit, which necessarily reduces the undesirable effects of residual magnetims, relieving the device of the possibility of the contacting surfaces sticking.

What I claim is:

In a packless solenoid of helix form for alternating current including an impervious tube, an electric coil mounted thereon, a magnetic stop fixed at one end of said tube, the combination of a movable plunger within said tube making a loose fit within the walls of said tube, the said plunger and stop having interengaging means comprising a projecting pin portion of the stop and an apertured portion of the plunger forming a pocket slidably receiving the pin, the proportions of the pin and pocket being such as to make a close fit of the pin within the pocket and such as to cause a continuous engagement of the pin and pocket during the entire movement of the plunger for guiding said plunger in a single position axially of said tube thereby dispensing with any other bearings for said plunger, a shading coil flush with the exposed surface of said stop, the plunger having an opening extending transversely through said plunger into the inner end of said pocket, thereby forming an escape passage for fluid and foreign substances entering said pocket.

GEORGE STUMPF.